US010983556B2

(12) United States Patent
Chu et al.

(10) Patent No.: US 10,983,556 B2
(45) Date of Patent: Apr. 20, 2021

(54) ELECTRONIC DEVICE AND EXPANSION ELECTRONIC SYSTEM

(71) Applicants: Yuan-Ping Chu, Taipei (TW); Jyh-Chyang Tzou, Taipei (TW); Tsai-Yu Lin, New Taipei (TW); Chun-Ping Li, New Taipei (TW)

(72) Inventors: Yuan-Ping Chu, Taipei (TW); Jyh-Chyang Tzou, Taipei (TW); Tsai-Yu Lin, New Taipei (TW); Chun-Ping Li, New Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/276,631

(22) Filed: Feb. 15, 2019

(65) Prior Publication Data
US 2019/0278326 A1   Sep. 12, 2019

(30) Foreign Application Priority Data

Mar. 8, 2018 (TW) .................................. 107107961

(51) Int. Cl.
*G06F 3/033* (2013.01)
*G09G 5/08* (2006.01)
(Continued)

(52) U.S. Cl.
CPC .......... *G06F 1/1626* (2013.01); *G06F 1/1632* (2013.01); *G06F 1/1654* (2013.01); *G06F 3/0202* (2013.01)

(58) Field of Classification Search
CPC ..................................................... G06F 3/0482
See application file for complete search history.

(56) References Cited

U.S. PATENT DOCUMENTS 6,404,415 B1 * 6/2002 Kim ...................... G06F 1/1616
345/157
8,305,241 B2   11/2012 Wang et al.
(Continued)

FOREIGN PATENT DOCUMENTS

CN   2582334   10/2003
CN   101655721   2/2010
(Continued)

*Primary Examiner* — Nan-Ying Yang
(74) *Attorney, Agent, or Firm* — JCIPRNET

(57) ABSTRACT

An electronic device including a main body, a handle and a driven mechanism is provided. The main body includes a base and a button unit movably disposed on the base. The handle is movably connected to the main body. The handle is adapted to be rotated from a first position to a second position relative to the main body. The driven mechanism includes a first connection element and an ascending/descending assembly. A first section of the first connection element is fixed to the handle, and a second section of the first connection element is movably disposed in the base. The ascending/descending assembly is disposed in the base and located between the second section and a bottom of the button unit. When the handle is rotated from the first position to the second position, the first connection element moves with the handle, and the ascending/descending assembly is moved with the second section and lifts up the button unit.

20 Claims, 12 Drawing Sheets

(51) Int. Cl.
*G06F 3/041* (2006.01)
*G06F 1/16* (2006.01)
*G06F 3/02* (2006.01)

(56) References Cited

U.S. PATENT DOCUMENTS

2007/0060393 A1\* 3/2007 Wu .................. A63F 13/06
 463/47
2008/0146336 A1\* 6/2008 Feldman ............ A63F 13/02
 463/37

FOREIGN PATENT DOCUMENTS

| CN | 101083882 | 12/2010 |
| TW | I539985 | 7/2016 |

\* cited by examiner

ELECTRONIC DEVICE AND EXPANSION ELECTRONIC SYSTEM

CROSS-REFERENCE TO RELATED APPLICATION

This application claims the priority benefit of Taiwan application serial no. 107107961, filed on Mar. 8, 2018. The entirety of the above-mentioned patent application is hereby incorporated by reference herein and made a part of this specification.

BACKGROUND OF THE INVENTION

1. Field of the Invention

The invention relates to an electronic device and an expansion electronic system, and particularly relates to a transformable electronic device and an expansion electronic system including the transformable electronic device.

2. Description of Related Art

Owing to the development of science and technology in recent years, the performance of electronic products, such as laptop computers and tablet computers, has become much better. Therefore, more and more users play video games on such electronic products. To ensure smooth operation and pursue a better operating experience during gaming, it is common to use an external game controller when the users play video games. However, using an external game controller seems less convenient, as the external game controller is usually sold separately, and the user needs to additionally carry the external game controller when he/she is away from home.

SUMMARY OF THE INVENTION

One or some exemplary embodiments provide an electronic device that is transformable to cope with different needs.

An embodiment of the invention provides an expansion electronic system including the electronic device.

An electronic device according to an embodiment of the invention includes a main body, a handle, and a driven mechanism. The main body includes a base and a button unit movably disposed on the base. The handle is movably connected to the main body, and the handle is adapted to be rotated from a first position to a second position relative to the main body. The driven mechanism includes a first connection element and an ascending/descending assembly. The first connection element includes a first section and a second section away from each other. The first section is fixed to the handle, and the second section is movably disposed in the base. The ascending/descending assembly is disposed in the base and located between the second section of the first connection element and a bottom of the button unit. When the handle is rotated from the first position to the second position, the first connection element moves with the handle, and the ascending/descending assembly is moved with the second section of the first connection element to lift up the button unit.

An expansion electronic system according to an embodiment of the invention includes an input device and the electronic device. The input device includes a keyboard module. The electronic device is detachably assembled to the input device, and the main body of the electronic device includes a touch pad.

According to an embodiment of the invention, when the handle is rotated from the second position to the first position, the first connection element moves with the handle, and the ascending/descending assembly is moved with the second section of the first connection element and lowers the button unit.

According to an embodiment of the invention, when the first connection element is a first flexible connection element, and when the handle is moved from the first position to the second position, the first connection element moves with the handle, and the ascending/descending assembly is moved with the second section of the first connection element and lifts up the button unit.

According to an embodiment of the invention, the electronic device further includes a flexible external cover. The flexible external cover covers and is fixed to a portion of the main body and a portion of the handle, and the driven mechanism is movably disposed in the flexible external cover.

According to an embodiment of the invention, the flexible external cover includes an annular preserved deformation region. A portion of the flexible external cover encompassed by the annular preserved deformation region corresponds to the button unit, the annular preserved deformation region is bent to form an annular trench, and a thickness of the annular preserved deformation region is less than a thickness of the flexible external cover excluding the annular preserved deformation region.

According to an embodiment of the invention, a shape encompassed by the annular trench is circular, elliptical, or polygonal.

According to an embodiment of the invention, the electronic device further includes a second flexible connection element. The second flexible connection element connects the base and the handle, and the flexible external cover covers and is fixed to the second flexible connection element.

According to an embodiment of the invention, the handle is adapted to be bent relative to the main body along a virtual bending line, and an extending direction of the second flexible connection element intersects the virtual bending line.

According to an embodiment of the invention, the flexible external cover includes a first material region and a second material region excluding the first material region. The first material region is located between the base and the handle, and an elastic modulus of the first material region is greater than an elastic modulus of the second material region.

According to an embodiment of the invention, the electronic device further includes a biaxial hinge assembly. The biaxial hinge assembly includes a first pivot and a second pivot respectively pivoted to the main body and the handle. Accordingly, the handle is adapted to be rotated between the first position and the second position.

According to an embodiment of the invention, the second section of the first connection element has a plurality of apertures, the handle covers the second section, and portions of the handle extend into the apertures.

According to an embodiment of the invention, the ascending/descending assembly includes a first protrusion, a second protrusion, and a linking rod. The first protrusion is fixed to the bottom of the button unit and includes a first slot. The first slot includes a first blocking surface and a second blocking surface adjacent to each other. The second protrusion is fixed to a portion of the second section facing toward the first protrusion and includes a second slot. The second slot includes a third blocking surface and a fourth blocking surface adjacent to each other. The first blocking surface is opposite to the third blocking surface, and the second blocking surface is opposite to the fourth blocking surface. The linking rod is respectively pivoted to the first protrusion and the second protrusion and adapted to be movable in the first slot and the second slot.

According to an embodiment of the invention, the ascending/descending assembly includes a first curved bump disposed at the bottom of the button unit and a second curved bump disposed at the second section of the first connection element. When the handle is rotated from the first position to the second position, the second curved bump pushes the first curved bump upward.

According to an embodiment of the invention, the base includes a guiding portion, the button unit is adapted to be lifted up along the guiding portion, and an extending direction of the guiding portion is perpendicular to a moving direction of the second section.

According to an embodiment of the invention, the handle is adapted to be bent relative to the main body along a virtual bending line, and an included angle of the virtual bending line relative to a virtual central line of the main body ranges from 60 degrees to 90 degrees.

According to an embodiment of the invention, the base includes a first base side end and a second base side end opposite to each other. A length of the first base side end is less than or equal to a length of the second base side end. A virtual central line of the main body divides each of the length of the first base side end and the length of the second base side end into two equal parts. The electronic device includes an electronic device side end away from the base. A distance between the electronic device side end and the virtual central line is x, the handle is adapted to be bent relative to the main body along a virtual bending line, and a distance x' between an intersecting point of the first base side end and the virtual central line and an intersecting point between the first base side end and the virtual bending line is greater than or equal to ½ x.

According to an embodiment of the invention, the base includes a third base side end. The handle includes a second handle side end near the third base side end, and the third base side end and the second handle side end exhibit curved outer profiles.

According to an embodiment of the invention, a width of the electronic device is the same as a width of the input device.

According to an embodiment of the invention, one of the input device and the electronic device includes a notch, and the other includes a hook detachably fixed to the notch.

Based on the above, the handle of the electronic device according to the embodiments of the invention is adapted to be rotated from the first position to the second position relative to the main body. Accordingly, the electronic device may be transformed into different states to cope with different needs of use. Besides, in the electronic device according to the embodiments of the invention, when the handle is rotated from the first position to the second position, the first connection element of the driven mechanism is moved with the handle to drive the ascending/descending assembly. Accordingly, the ascending/descending assembly may lift the button unit of the main body. Thus, when the handle is at the first position, the button unit may be located at a position lower than the upper surface of the main body to avoid an erroneous touch by the user. In addition, when the handle is rotated to the second position, the button unit protrudes from the upper surface of the main body for the user to operate.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
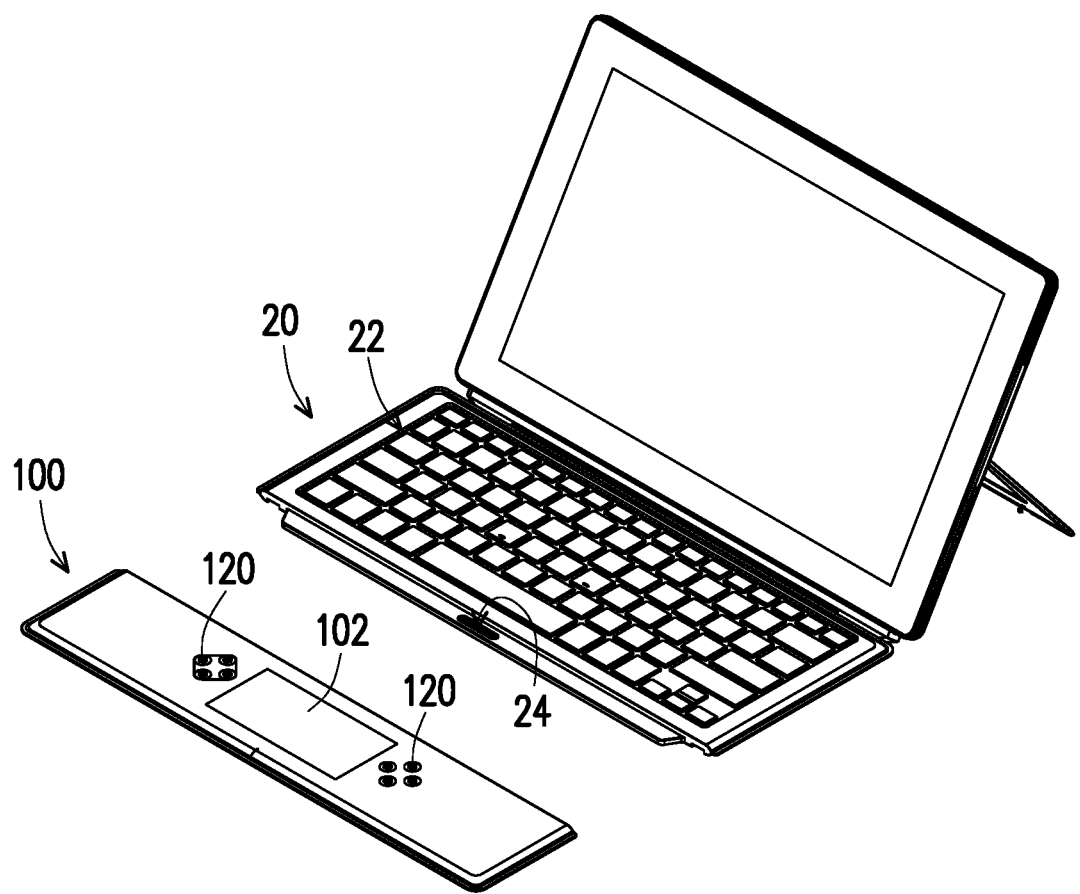
FIG. 1 is a schematic view illustrating an expansion electronic system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view illustrating an expansion electronic system according to an embodiment of the invention. Referring to FIG. 1, an expansion electronic system 10 of the embodiment includes an input device 20 and an electronic device 100. In the embodiment, the expansion electronic system 10 is an expansion system in signal connection with a tablet computer, for example. As an example, in the expansion electronic system 10 of the embodiment, the input device 20 may include a keyboard module 22, and the electronic device 100 may include a touch pad 102. In other words, the expansion electronic system 10 may be a combination of the keyboard module 22 and the touch pad 102. The user may operate the tablet computer by inputting a signal to the keyboard module 22 and the touch pad 102 of the expansion electronic system 10. However, the types of the input device 20 and the electronic device 100 are not limited thereto.

In the embodiment, the electronic device 100 may be detachably assembled to the input device 20. In other words, the electronic device 100 may be fixed to or separated from the input device 20. FIG. 1 illustrates a state where the electronic device 100 is separated from the input device 20. Besides, in the embodiment, the electronic device 100 further includes regions on two sides of the touch pad 102. The regions may serve as a palm rest of the user, so that the user may place or bear his/her hands on the palm rest when inputting information. Therefore, in the embodiment, when the electronic device 100 is assembled to the input device 20, the appearance of the expansion electronic system 10 may be similar to the appearance of a lower body of a conventional laptop computer, and a width of the electronic device 100 is the same as a width of the input device 20. However, in other embodiments, the relation between the size of the electronic device 100 and the input device 20 is not limited thereto.

Figure 2:
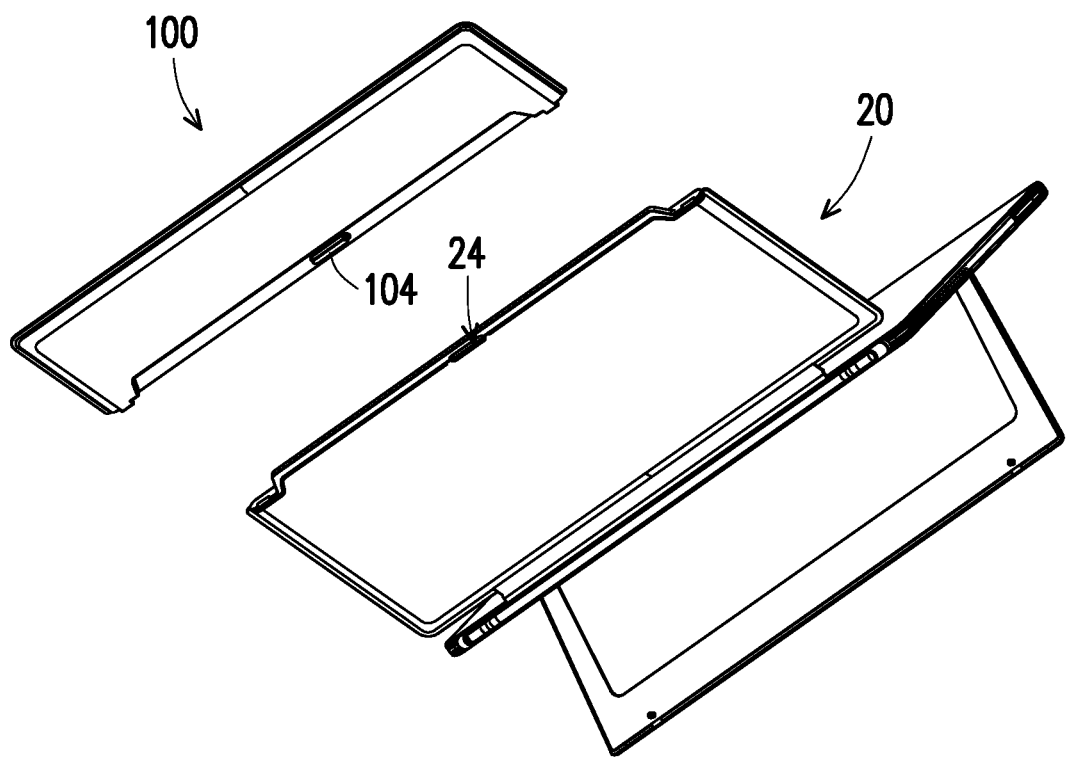
FIG. 2 is a schematic view from another perspective of FIG. 1.

FIG. 2 is a schematic view from another perspective of FIG. 1. Referring to FIG. 2, in the embodiment, one of the input device 20 and the electronic device 100 includes a notch 24, and the other includes a hook 104 that is detachably fixed to the notch 24. More specifically, in the embodiment, the input device 20 includes the notch 24 and the electronic device 100 includes the hook 104. Through fitting between the electronic device 100 and the input device 20 by means of the hook 104 and the notch 24, the electronic device 100 may be fixed to the input device 20 when the electronic device 100 serves as the touch pad 102 and the palm rest similar to those of a laptop computer. When the electronic device 100 is transformed into other configurations, the electronic device 100 may be easily removed from the input device 20 through a simple operation. Nevertheless, in other embodiments, the input device 20 and the electronic device 100 may also be fixed to each other by other means, such as engagement, magnetic attraction, adhesion, and/or the like. The invention does not intend to impose a limitation on this regard.

Figure 3:
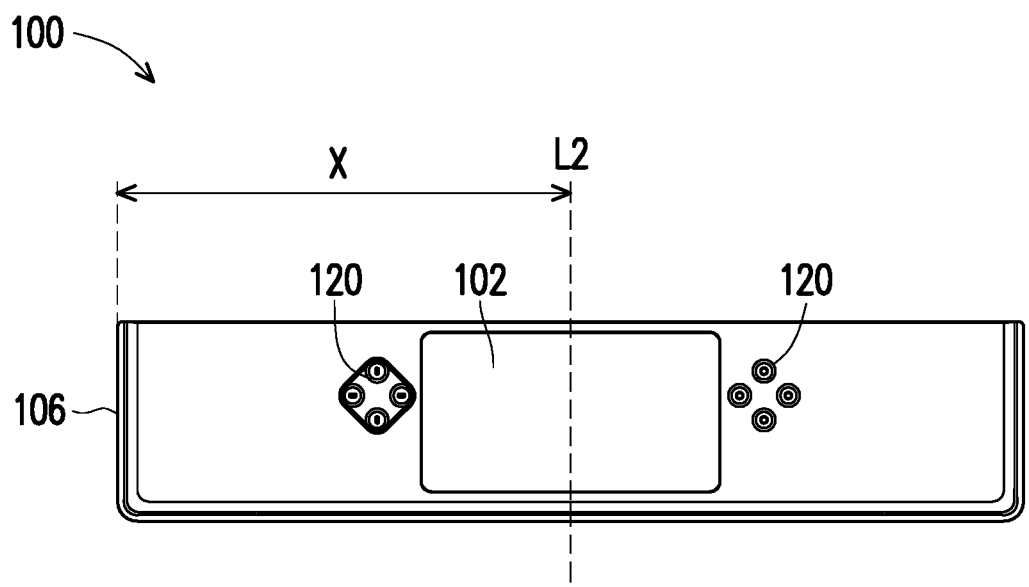
FIG. 3 is a schematic top view illustrating an electronic device of the electronic expansion system of FIG. 1.
Figure 4:
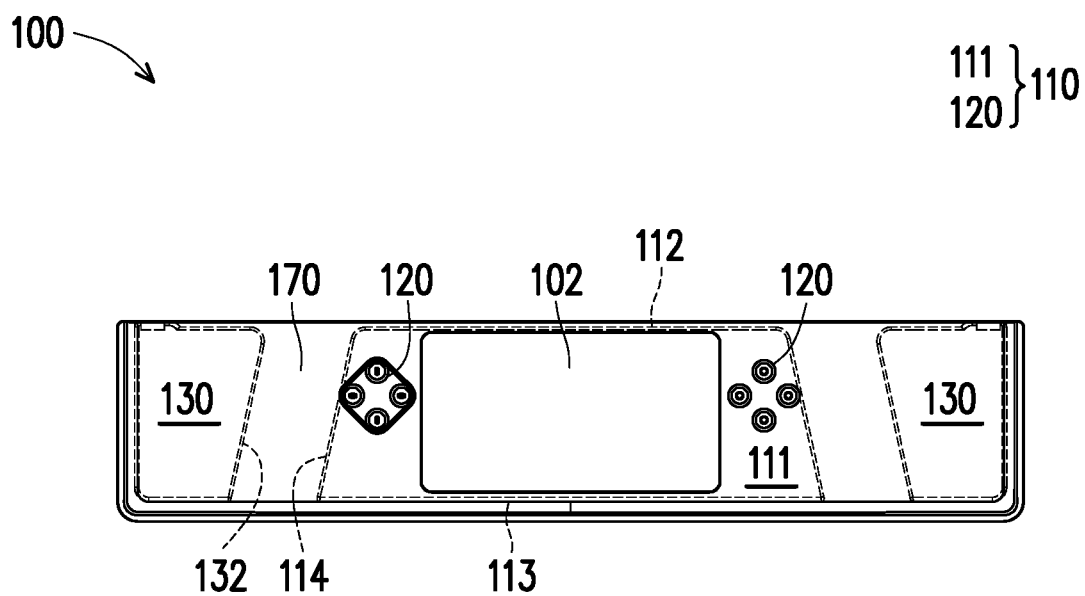
FIG. 4 is a schematic perspective view illustrating a main body and a handle of the electronic device of FIG. 3.
Figure 5:
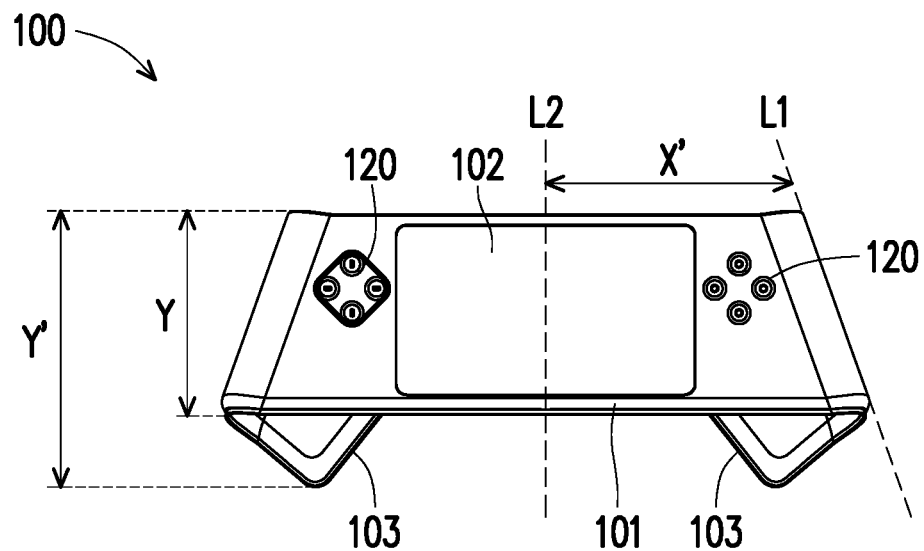
FIG. 5 is a schematic top view illustrating that the handle of the electronic device of FIG. 3 is located at a second position.
Figure 6:
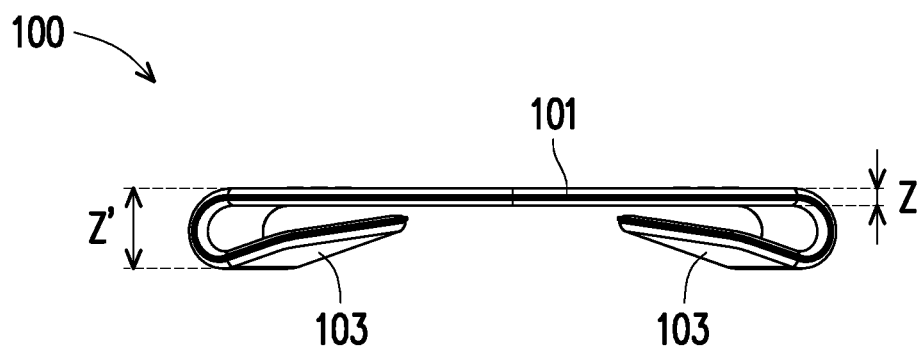
FIG. 6 is a schematic side view of FIG. 5.

In the embodiment, the electronic device 100 may be transformed into other configurations. Details in this regard will be described in the following. FIG. 3 is a schematic top view illustrating an electronic device of the electronic expansion system of FIG. 1. FIG. 4 is a schematic perspective view illustrating a main body and a handle of the electronic device of FIG. 3. FIG. 5 is a schematic top view illustrating that the handle of the electronic device of FIG. 3 is located at a second position. FIG. 6 is a schematic side view of FIG. 5.

Referring to FIGS. 3 to 6, in the embodiment, the electronic device 100 includes a main body 110 and at least one handle 130. More specifically, as shown in FIG. 4, the electronic device 100 of the embodiment includes the main body 110 and two handles 130 on two sides of the main body 110. In addition, the electronic device 100 of the embodiment further includes a flexible external cover 170. The flexible external cover 170 covers and is fixed to a portion of the main body 110 and a portion of the handle 130. In the embodiment, the main body 110 is more rigid than the external flexible cover 170, the handle 130 is more rigid than the external flexible cover 170, and the flexible external cover 170 is flexible. Therefore, the handle 130 may be movably connected to the main body 110 and adapted to be rotated (e.g., flipped/bent) from a first position P1 (e.g., a position located on the same plane as the main body 110) to a second position P2 (e.g., a position located below the main body 110) shown in FIGS. 5 and 6 relative to the main body 110. Nevertheless, the first position P1 and the second position P2 are not limited thereto.

In the embodiment, when the handle 130 is located at the first position P1, the electronic device 100 is in a configuration suitable to serve as the touch pad 102 and the palm rest of a laptop computer. When the handle 130 is located at the second position P2, the electronic device 100 is in a configuration suitable to serve as a game controller. As shown in FIG. 5, a portion of the electronic device 100 corresponding to the main body 110 may serve as an operating region 101 of the game controller, and a portion of the electronic device 100 corresponding to the handle 130 may serve as a grip region 103 for the user to handle. Nevertheless, the purposes of the electronic device 100 in different configurations are not limited thereto.

Back to FIG. 4, in the embodiment, the main body 110 includes a base 111, and the base 111 includes a first base side end 112 (e.g., an upper side) and a second base side end 113 (e.g., a lower side) opposite to each other. In the embodiment, a length of the first base side end 112 is less than or equal to a length of the second base side end 113. Accordingly, from a top perspective, the base 111 is similar to a trapezoid shape whose bottom is wider than the top. Besides, the base 111 includes a third base side end 114 connecting the first base side end 112 and the second base side end 113. The handle 130 includes a second handle side end 132 near the third base side end 114. In the embodiment, the second handle side end 132 of the handle 130 is substantially parallel to the third base side end 114. Accordingly, from a top perspective, the handle 130 is in a trapezoid shape whose top is wider than the bottom. Of course, the shapes of the base 111 and the handle 130 are not limited thereto.

Referring to FIGS. 3 and 4, in the embodiment, a virtual central line L2 of the main body 110 divides each of the length of the first base side end 112 and the length of the second base side end 113 into two equivalent parts. The handle 130 includes an electronic device side end 106 (shown in FIG. 3) away from the base 111. A distance between the first handle side end 132 and the virtual central line L2 is x. In the embodiment, the length of the first base side end 112 is greater than or equal to ½x and less than x. Besides, as shown in FIG. 5, the handle 130 is adapted to be bent relative to the main body 110 along a virtual bending line L1. In the embodiment, an included angle of the virtual bending line L1 relative to the virtual central line L2 of the main body 110 ranges from 60 degrees to 90 degrees. Besides, in the embodiment, an original width of the electronic device 100 is Y, and an overall width of the electronic device 100 becomes Y' after the handle 130 is bent along the virtual bending line L1, wherein Y'>Y. Besides, as shown in FIG. 6, an original height of the electronic device 100 is Z, and an overall height of the electronic device 100 becomes Z' after the handle 130 is bent along the virtual bending line L1, wherein Z'>Z. Such size and angular relationships allow the electronic device 100 to offer a better handling experience when the electronic device 100 is bent to form a game controller.

Figure 7:
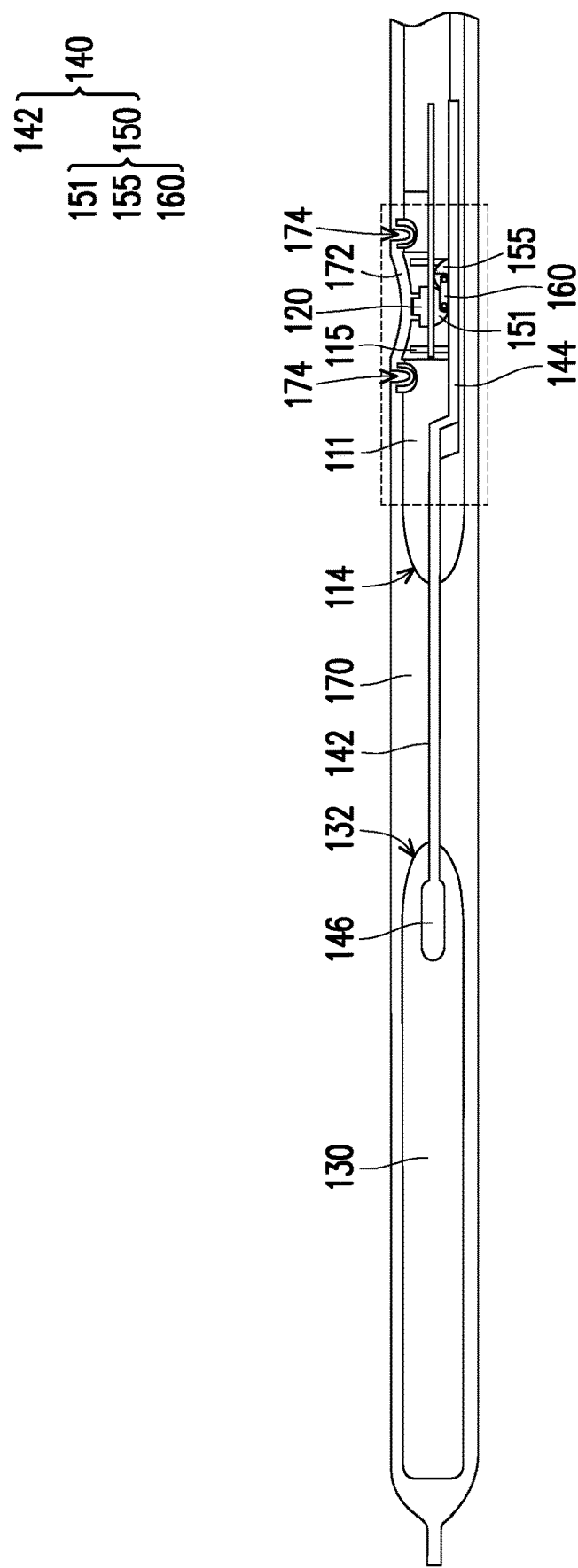
FIG. 7 is a partial schematic cross-sectional view illustrating that a handle of the electronic device of FIG. 3 is located at a first position.
Figure 8:
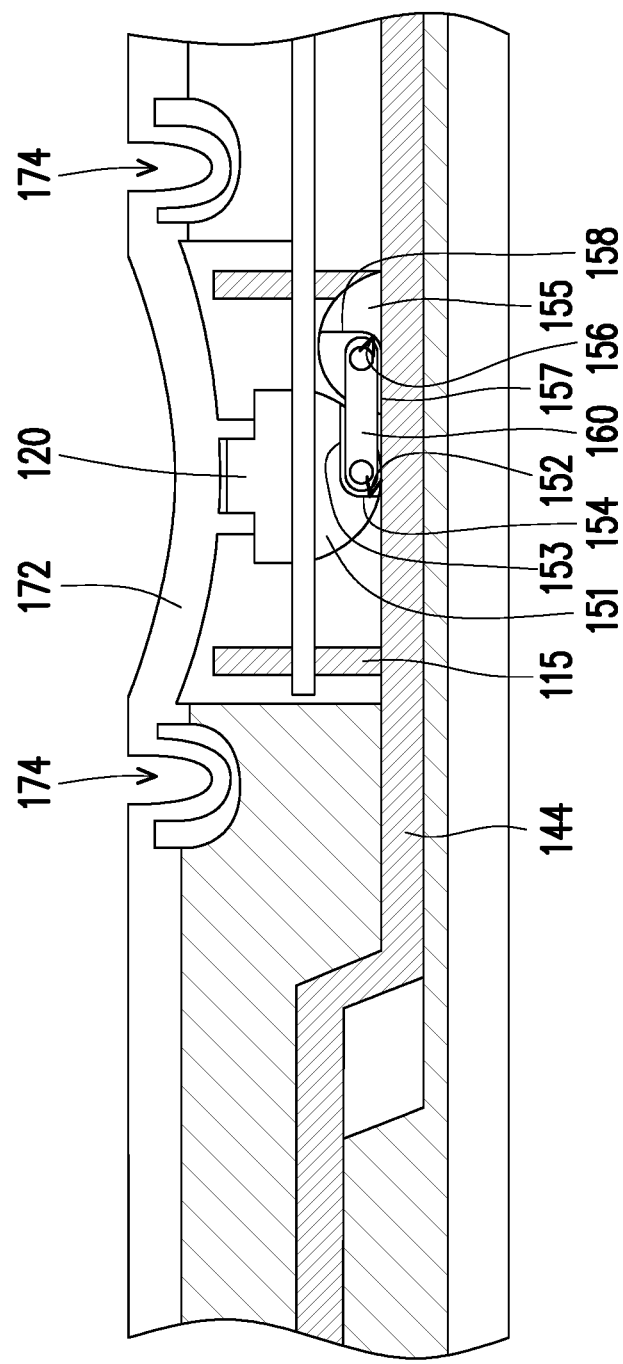
FIG. 8 is a schematic partially enlarged view of FIG. 7.

FIG. 7 is a partial schematic cross-sectional view illustrating that a handle of the electronic device of FIG. 3 is located at a first position. FIG. 8 is a schematic partially enlarged view of FIG. 7. Referring to FIGS. 7 and 8, in the embodiment, the main body 110 may further include at least one button unit 120 movably disposed on the base 111. The electronic device 100 further includes a driven mechanism 140, and the driven mechanism 140 includes a first connection element 142 and an ascending/descending assembly 150. The first connection element 142 is a first flexible connection element, for example, and is thus bendable and flexible. However, the type of the first connection element 142 is not limited thereto. The first connection element 142 includes a first section 144 (right end) and a second section 146 (left end) away from each other. In addition, the first section 144 is fixed to the handle 130, and the second section 146 is movably disposed in the base 111. Moreover, the first connection element 142 is movably disposed in the flexible external cover 170.

Besides, in the embodiment, the ascending/descending assembly 150 is disposed in the base 111 and located between the second section 146 of the first connection element 142 and a bottom of the button unit 120. Specifically, as shown in FIG. 8, the ascending/descending assembly 150 of the embodiment includes a first protrusion 151, a second protrusion 155, and a linking rod 160. The first protrusion 151 is fixed to the bottom of the button unit 120 and includes a first slot 152. The first slot 152 includes a first blocking surface 153 and a second blocking surface 154 adjacent to each other. The second protrusion 155 is fixed to a portion of the second section 146 facing toward the first protrusion 151 and includes a second slot 156. The second slot 156 includes a third blocking surface 157 and a fourth blocking surface 158 adjacent to each other. The first blocking surface 153 is opposite to the third blocking surface 157, and the second blocking surface 154 is opposite to the fourth blocking surface 158. The linking rod 160 is respectively pivoted to the first protrusion 151 and the second protrusion 155, and is adapted to be movable in the first slot 152 and the second slot 156.

Figure 9:
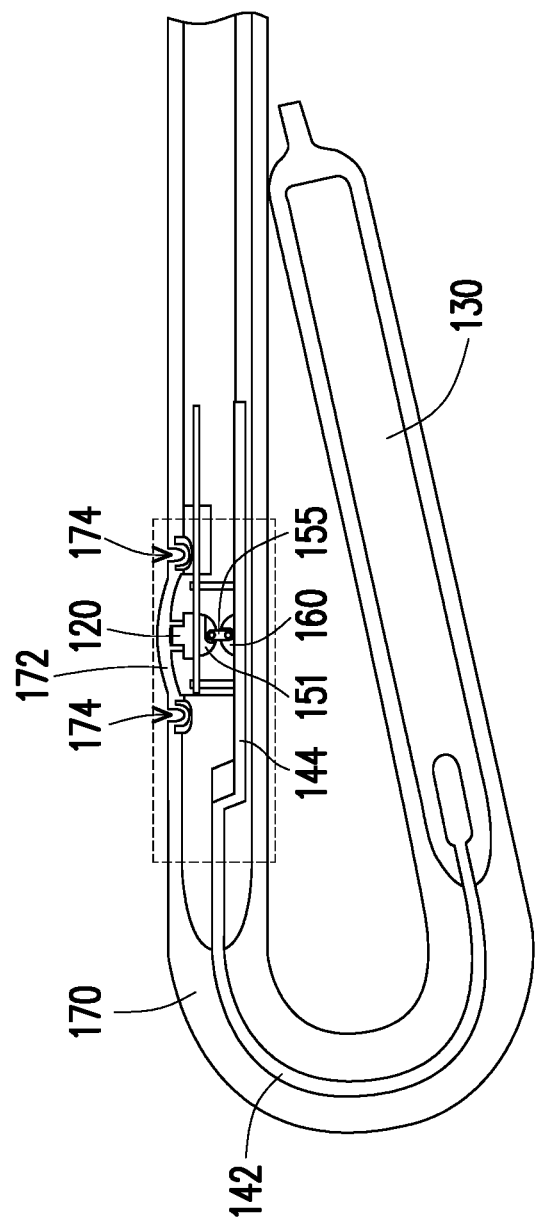
FIG. 9 is a partial schematic cross-sectional view illustrating that the handle of the electronic device of FIG. 3 is located at a second position.
Figure 10:
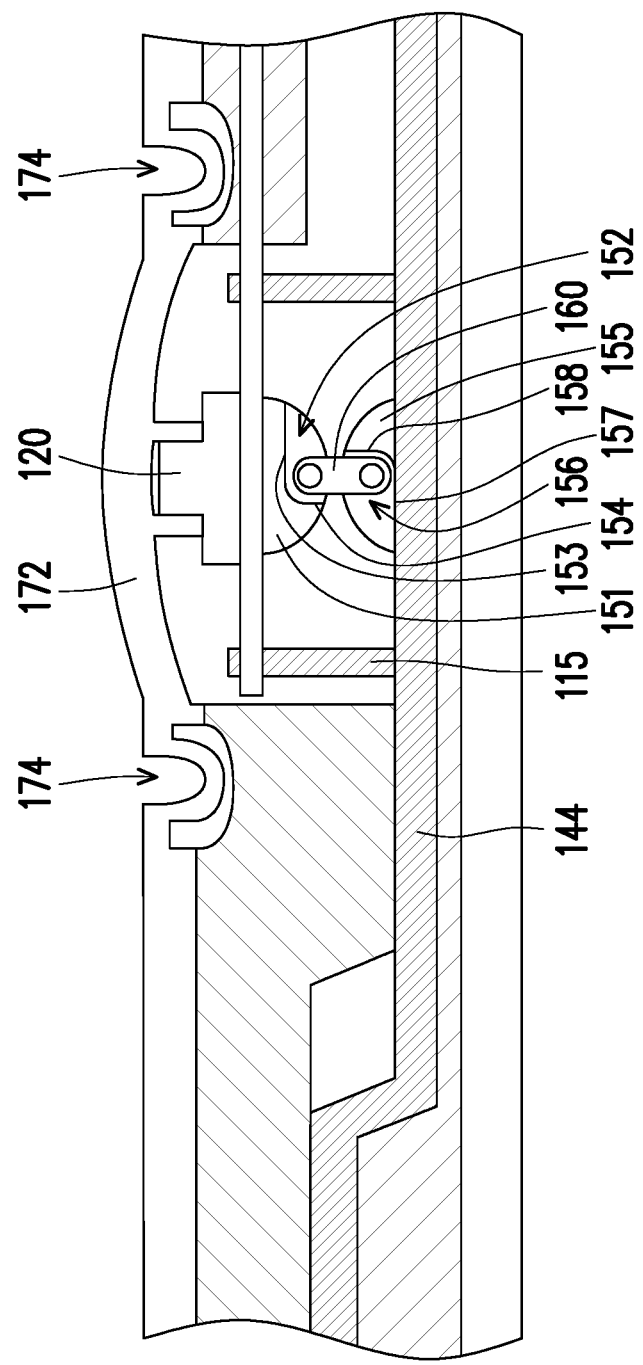
FIG. 10 is a schematic partially enlarged view of FIG. 9.

FIG. 9 is a partial schematic cross-sectional view illustrating that the handle of the electronic device of FIG. 3 is located at a second position. FIG. 10 is a schematic partially enlarged view of FIG. 9. Referring to FIGS. 7 to 10, in the embodiment, since the flexible external cover 170 is flexible, the flexible external cover 170 is slightly extensible. In addition, the first connection element 142 located inside is movable relative to the flexible external cover 170. Accordingly, when the handle 130 is moved from the first position P1 to the second position P2, the first section 144 of the first connection element 142 may be moved with the handle 130 to move the second section 146 of the first connection element 142 from the position shown in FIG. 8 to the position shown in FIG. 10. During the movement of the second section 146 of the first connection element 142, the second protrusion 155 connected to the second section 146 is also moved leftward with the second section 146. As shown in FIG. 8, one end (right end) of the linking rod 160 is pivoted to the second protrusion 155, and the other end (left end) of the linking rod 160 is pivoted to the first protrusion 151. When the second protrusion 155 is moved leftward, the right end of the linking rod 160 is moved leftward with the second protrusion 155 while being rotated pivotally relative to the second protrusion 155. In addition, the left end of the linking rod 160 is also rotated pivotally relative to the first protrusion 151. Accordingly, the linking rod 160 is rotated from a horizontal arrangement shown in FIG. 8 to a vertical arrangement shown in FIG. 10, and the button unit 120 is thus lifted up by the ascending/descending assembly 150.

In the embodiment, as shown in FIG. 8, when the button unit 120 is not lifted up, the position of the button unit 120 is lower than the upper surface of the base 111. Under the circumstance, the button unit 120 is at a lower position and is less likely to be touched erroneously. In the embodiment, as shown in FIG. 10, when the button unit 120 is lifted up, the position of the button unit 120 is higher than the upper surface of the base 111. Under the circumstance, the user may easily press the button unit 120. In the same light, when the handle 130 is rotated from the second position P2 to the first position P1, the first connection element 142 moves with the handle 130, and the ascending/descending assembly 150 is moved with the second section 146 of the first connection element 142 to lower the button unit 120.

Moreover, as shown in FIG. 8, in the embodiment, the base 111 further includes a guiding portion 115. An extending direction (e.g., an up-down direction) of the guiding portion 115 is perpendicular to a moving direction (e.g., a left-right direction) of the second section 146. The button unit 120 is adapted to ascend or descend along the guiding portion 115 to ensure that the button unit 120 vertically ascends or descends.

Besides, in the embodiment, the flexible external cover 170 includes an annular preserved deformation region 174. The annular preserved deformation region 174 is bent to form an annular trench to define a press region 172 encompassed by the annular trench. The press region 172 of the flexible external cover 170 corresponds to the button unit 120, and the annular preserved deformation region 174 is configured for the user to conveniently identify the location of the button unit 120. Moreover, as shown in FIG. 8, a thickness of the annular preserved deformation region 174 is less than a thickness of the flexible external cover 170 excluding the annular preserved deformation region 174. Since the portion with a smaller thickness is less rigid, the annular preserved deformation region 174 is more deformable and may be deformed more to cope with the ascending/descending of the button unit 120. Besides, in the embodiment, the shape encompassed by the annular trench may be circular. However, in other embodiments, the shape encompassed by the annular trench may also be an ellipse or a polygonal shape, and the shape shall not be limited to the descriptions herein.

Furthermore, as shown in FIG. 7, the base 111 and the handle 130 are close to each other at the third base side end 114 and the second handle side end 132. In the embodiment, the third base side end 114 of the base 111 and the second handle side end 132 of the handle 130 respectively exhibit curved external profiles. Such design reduces the pressure taken by the flexible external cover 170 from the third base side end 114 and the second handle side end 132 when the flexible external cover 170 is bent, so as to reduce the chance that the flexible external cover 170 is penetrated through by the third base side end 114 and the second handle side end 132.

Nevertheless, the electronic device 100 is not limited to the form above. Electronic devices in other forms will be described in the following. In the following embodiments, components identical to or similar with those of the previous embodiment will be referred to with identical or similar reference symbols. In addition, only the main differences between different embodiments will be described, while similar or identical parts will not be further reiterated in the following.

Figure 11:
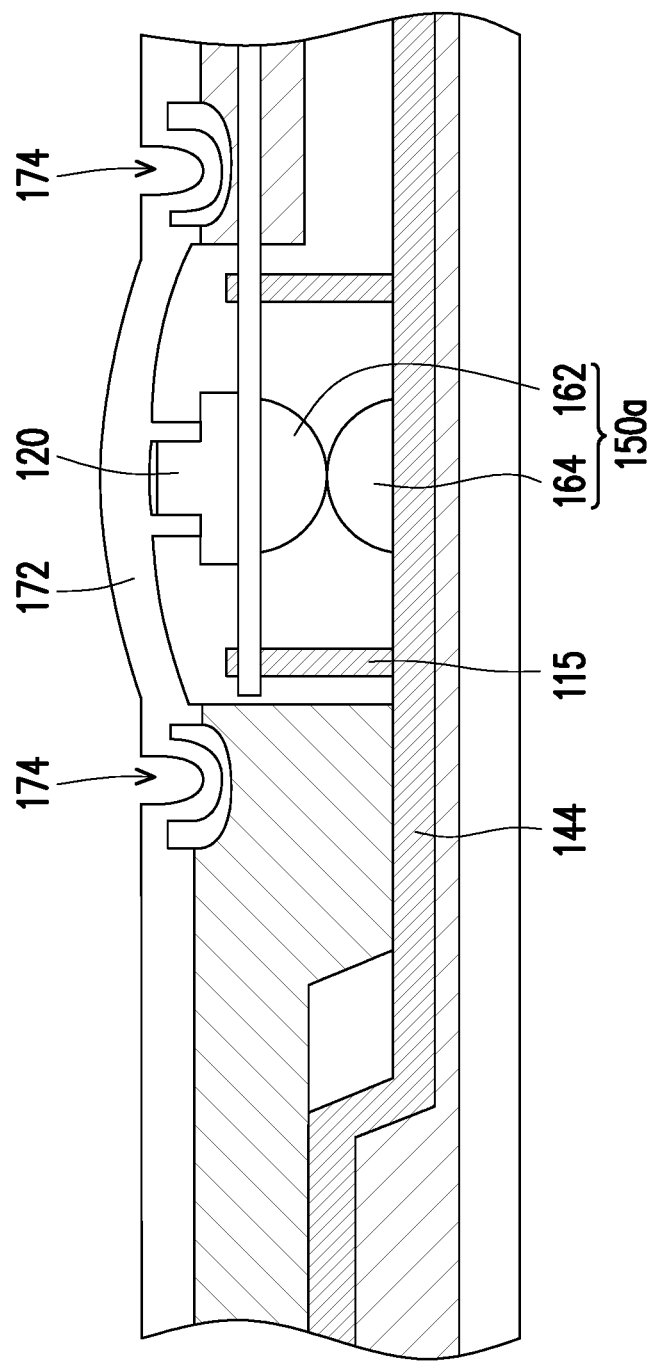
FIG. 11 is a partial schematic cross-sectional view illustrating an electronic device according to another embodiment of the invention.

FIG. 11 is a partial schematic cross-sectional view illustrating an electronic device according to another embodiment of the invention. Referring to FIG. 11, an ascending/descending assembly 150a of FIG. 11 mainly differs from the ascending/descending assembly 150 of FIG. 10 in that the ascending/descending assembly 150a of the embodiment includes a first curved bump 162 disposed at the bottom of the button unit 120 and a second curved bump 164 disposed at the second section 146 of the first connection element 142. The second curved bump 164 may contact the first curved bump 162 to push the first arc-shaped bump 162 upward when the handle 130 is rotated from the first position P1 to the second position P2.

Figure 12:
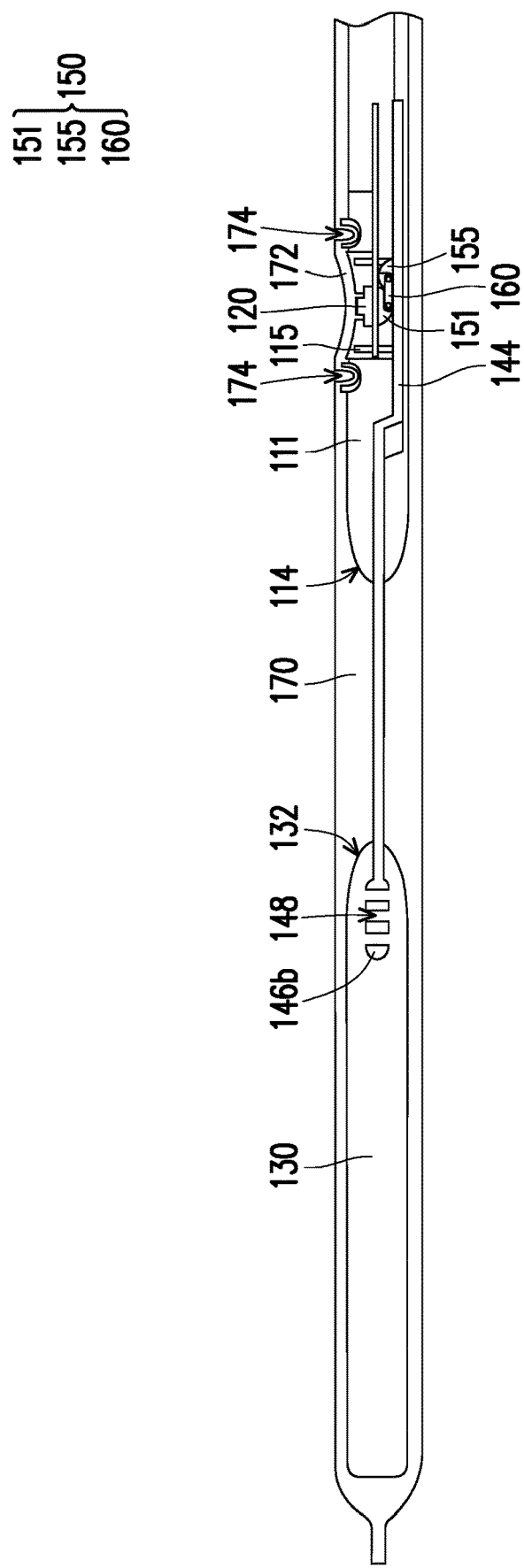
FIG. 12 is a partial schematic cross-sectional view illustrating an electronic device according to another embodiment of the invention.

FIG. 12 is a partial schematic cross-sectional view illustrating an electronic device according to another embodiment of the invention. Referring to FIG. 12, a second section 146b of the first connection element in FIG. 12 mainly differs from the second section 146 of the first connection element 142 in that the second section 146b of the embodiment includes a plurality of apertures 148, the handle 130 covers the second section 146b, and portions of the handle 130 extend into the apertures 148. In the embodiment, the connection strength between the handle 130 and the second section 146b is strengthened by configuring the handle 130 to extend into the apertures 148 of the second section 146b. The handle 130 may be manufactured by injection molding, for example, and the material of the handle 130 may include a rigid plastic material or a soft material. The invention does not intend to impose a limitation on the material.

Figure 13:
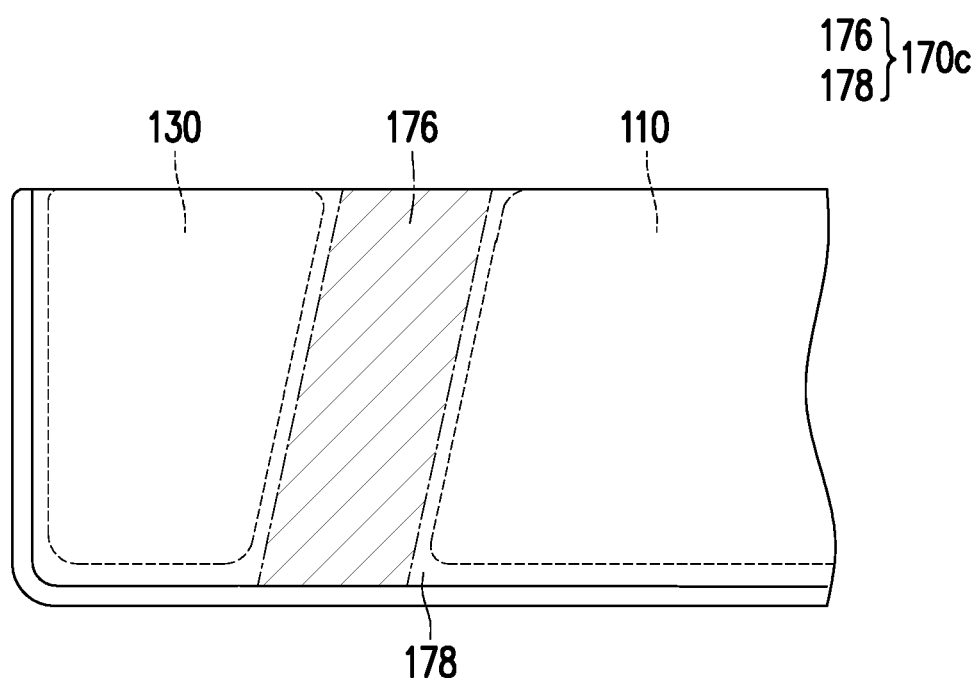
FIGS. 13 to 15 are partial schematic views illustrating a plurality of electronic devices according to other embodiments of the invention.
Figure 14:
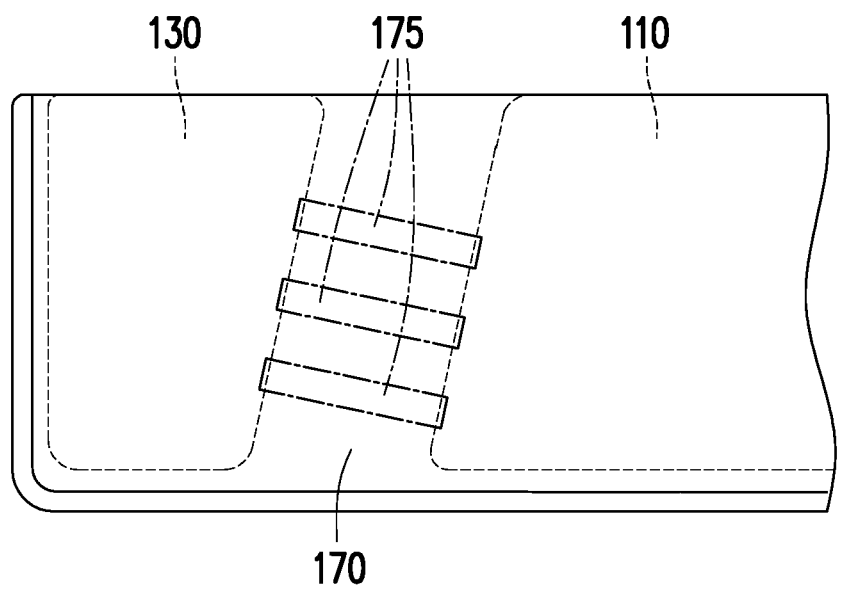
Figure 15:
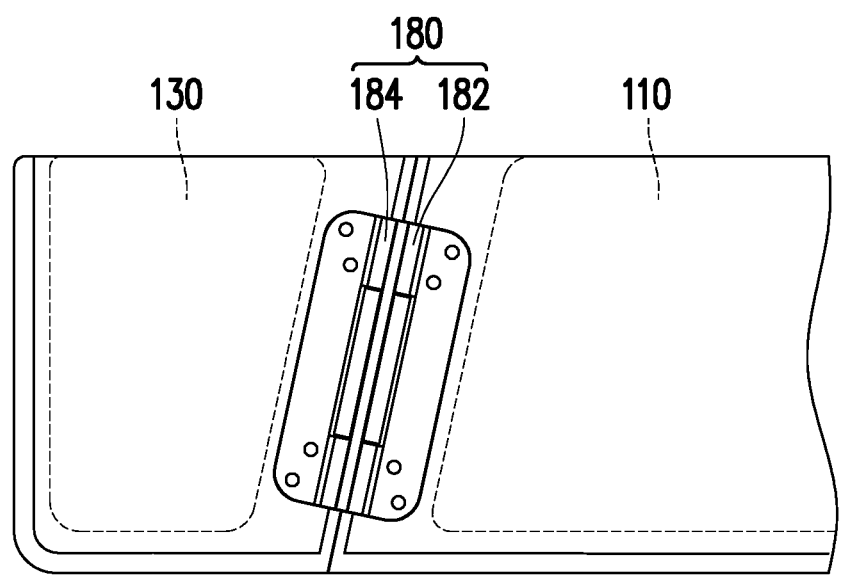

FIGS. 13 to 15 are partial schematic views illustrating a plurality of electronic devices according to other embodiments of the invention. Referring to FIG. 13, a flexible external cover 170c of FIG. 13 mainly differs from the flexible external cover 170 of FIG. 4 in that the flexible external cover 170c of the embodiment includes a first material region 176 and a second material region 178 excluding the first material region 176. The first material region 176 is located between the base 111 and the handle 130, and an elastic modulus of the first material region 176 is greater than an elastic modulus of the second material region 178. In the embodiment, since the first material region 176 of the flexible external cover 170c has a greater elastic modulus and thus a higher tenacity, the strength of a region of the flexible external cover 170c between the main body 110 and the handle 130 may be strengthened, and the chance that the region of the flexible external cover 170c between the main body 110 and the handle 130 is broken when being bent is reduced.

Referring to FIG. 14, the embodiment of FIG. 14 mainly differs from the embodiment of FIG. 4 in that the main body 110 and the handle 130 of the embodiment are further connected to each other via at least one second flexible connection element 175 in addition to the flexible external cover 170. The flexible external cover 170 covers and is fixed to the second flexible connection element 175. Accordingly, the connection strength between the base 111 and the handle 130 may be strengthened. In the embodiment, three second flexible connection elements 175 are shown as an example. However, the number of the second flexible connection elements 175 is not limited thereto. Moreover, in the embodiment, an extending direction of the second flexible connection element 175 intersects (e.g., perpendicular to) the edges (i.e., the virtual bending lines L1 marked in FIG. 5) of the main body 110 and the handle 130 opposite to each other. Nevertheless, the extending direction of the second flexible connection element 175 is not limited thereto.

Referring to FIG. 15, the embodiment of FIG. 15 mainly differs from the embodiment of FIG. 4 in that the main body 110 and the handle 130 of the embodiment are pivoted to each other via a biaxial hinge assembly 180. The biaxial hinge assembly 180 includes a first pivot 182 and a second pivot 184 respectively pivoted to the main body 110 and the handle 130. Accordingly, the handle 130 may be rotated between the first position P1 and the second position P2 relative to the main body 110.

In view of the foregoing, the handle of the electronic device according to the embodiments of the invention is adapted to be rotated from the first position to the second position relative to the main body. Accordingly, the electronic device may be transformed into different states to cope with different needs of use. Besides, in the electronic device according to the embodiments of the invention, when the handle is rotated from the first position to the second position, the first connection element of the driven mechanism is moved with the handle to drive the ascending/descending assembly. Accordingly, the ascending/descending assembly may lift the button unit of the main body. Thus, when the handle is at the first position, the button unit may be located at a position lower than the upper surface of the main body to avoid an erroneous touch by the user. In addition, when the handle is rotated to the second position, the button unit protrudes from the upper surface of the main body for the user to operate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
a main body, comprising a base and a button unit movably disposed on the base;
a handle, movably connected to the main body and adapted to be folded from a first position to a second position relative to the main body; and
a driven mechanism, comprising:
a first connection element, comprising a first section and a second section away from each other, wherein the first section is fixed to the handle, and the second section is movably disposed in the base; and
an ascending/descending assembly, disposed in the base and located between the second section of the first connection element and a bottom of the button unit, wherein when the handle is folded from the first position to the second position, the handle is folded backward and toward a back surface of the main body, the first connection element moves with the handle, and the ascending/descending assembly is moved with the second section of the first connection element to lift up the button unit.

2. The electronic device as claimed in claim 1, wherein when the handle is folded from the second position to the first position, the first connection element moves with the handle, and the ascending/descending assembly is moved with the second section of the first connection element and lowers the button unit.

3. The electronic device as claimed in claim 1, wherein the first connection element is a first flexible connection element, and when the handle is folded from the first position to the second position, the first connection element moves with the handle, and the ascending/descending assembly is moved with the second section of the first connection element and lifts up the button unit.

4. The electronic device as claimed in claim 1, further comprising:

a flexible external cover, covering and fixed to a portion of the main body and a portion of the handle, wherein the driven mechanism is movably disposed in the flexible external cover.

5. The electronic device as claimed in claim 4, wherein the flexible external cover comprises an annular preserved deformation region, a portion of the flexible external cover encompassed by the annular preserved deformation region corresponds to the button unit, the annular preserved deformation region is bent to form an annular trench, and a thickness of the annular preserved deformation region is less than a thickness of the flexible external cover excluding the annular preserved deformation region.

6. The electronic device as claimed in claim 5, wherein a shape encompassed by the annular trench is circular, elliptical, or polygonal.

7. The electronic device as claimed in claim 4, further comprising:
a second flexible connection element, connecting the base and the handle, wherein the flexible external cover covers and is fixed to the second flexible connection element.

8. The electronic device as claimed in claim 7, wherein the handle is adapted to be bent relative to the main body along a virtual bending line, and an extending direction of the second flexible connection element intersects the virtual bending line.

9. The electronic device as claimed in claim 4, wherein the flexible external cover comprises a first material region and a second material region excluding the first material region, the first material region is located between the base and the handle, and an elastic modulus of the first material region is greater than an elastic modulus of the second material region.

10. The electronic device as claimed in claim 1, further comprising:
a biaxial hinge assembly, comprising a first pivot and a second pivot respectively pivoted to the main body and the handle, such that the handle is adapted to be folded between the first position and the second position.

11. The electronic device as claimed in claim 1, wherein the second section of the first connection element has a plurality of apertures, the handle covers the second section, and portions of the handle extend into the apertures.

12. The electronic device as claimed in claim 1, wherein the ascending/descending assembly comprises:
a first protrusion, fixed to the bottom of the button unit and comprising a first slot comprising a first blocking surface and a second blocking surface adjacent to each other;
a second protrusion, fixed to a portion of the second section facing toward the first protrusion and comprising a second slot, wherein the second slot comprises a third blocking surface and a fourth blocking surface adjacent to each other, the first blocking surface is opposite to the third blocking surface, and the second blocking surface is opposite to the fourth blocking surface; and
a linking rod, respectively pivoted to the first protrusion and the second protrusion and adapted to be movable in the first slot and the second slot.

13. The electronic device as claimed in claim 1, wherein the ascending/descending assembly comprises a first arc-shaped bump disposed at the bottom of the button unit and a second arc-shaped bump disposed at the second section of the first connection element, and when the handle is folded from the first position to the second position, the second arc-shaped bump pushes the first arc-shaped bump upward.

14. The electronic device as claimed in claim 1, wherein the base comprises a guiding portion, the button unit is adapted to be lifted up along the guiding portion, and an extending direction of the guiding portion is perpendicular to a moving direction of the second section.

15. The electronic device as claimed in claim 1, wherein the handle is adapted to be bent relative to the main body along a virtual bending line, and an included angle of the virtual bending line relative to a virtual central line of the main body ranges from 60 degrees to 90 degrees.

16. The electronic device as claimed in claim 1, wherein the base comprises a first base side end and a second base side end opposite to each other, a length of the first base side end is less than or equal to a length of the second base side end, a virtual central line of the main body divides each of the length of the first base side end and the length of the second base side end into two equal parts, the electronic device comprises an electronic device side end away from the base, a distance between the electronic device side end and the virtual central line is x, the handle is adapted to be bent relative to the main body along a virtual bending line, and a distance x' between an intersecting point of the first base side end and the virtual central line and an intersecting point between the first base side end and the virtual bending line is greater than or equal to ½ x.

17. The electronic device as claimed in claim 1, wherein the base comprises a third base side end, the handle comprises a handle side end near the third base side end, and the third base side end and the handle side end exhibit curved outer profiles.

18. An expansion electronic system, comprising:
an input device, comprising a keyboard module; and
the electronic device as claimed in any one of claim 1, detachably assembled to the input device, wherein the main body of the electronic device comprises a touch pad.

19. The expansion electronic system as claimed in claim 18, wherein a width of the electronic device is the same as a width of the input device.

20. The expansion electronic system as claimed in claim 19, wherein one of the input device and the electronic device comprises a notch, and the other comprises a hook detachably fixed to the notch.

* * * * *